Aug. 21, 1962  R. C. SCHWARTZ ETAL  3,049,763
GRID STRUCTURE FOR SEED COTTON CLEANERS AND THE LIKE
Filed May 16, 1961  2 Sheets-Sheet 2
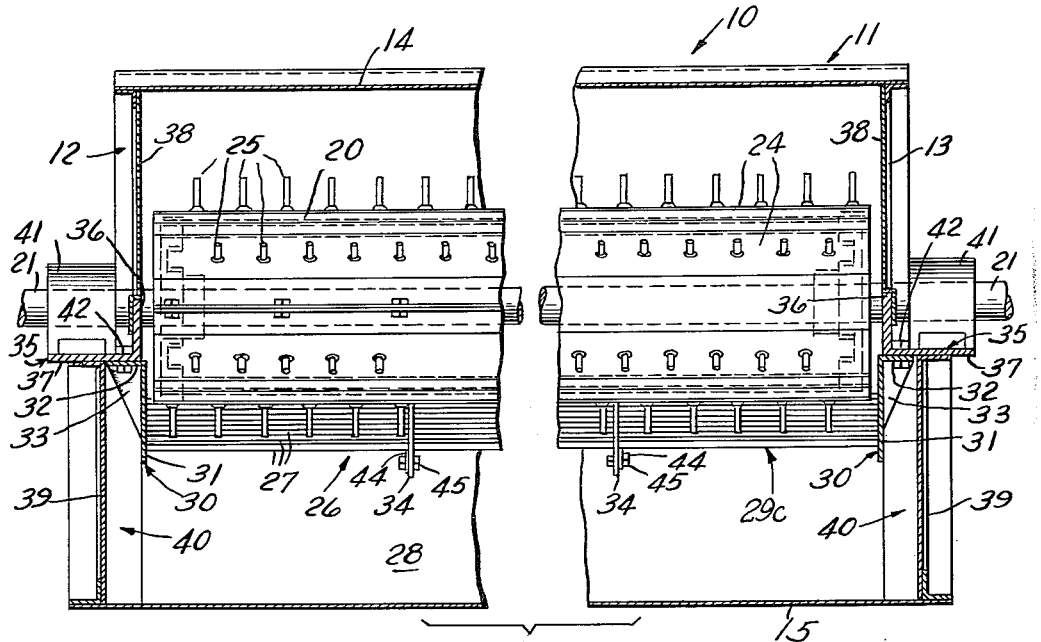
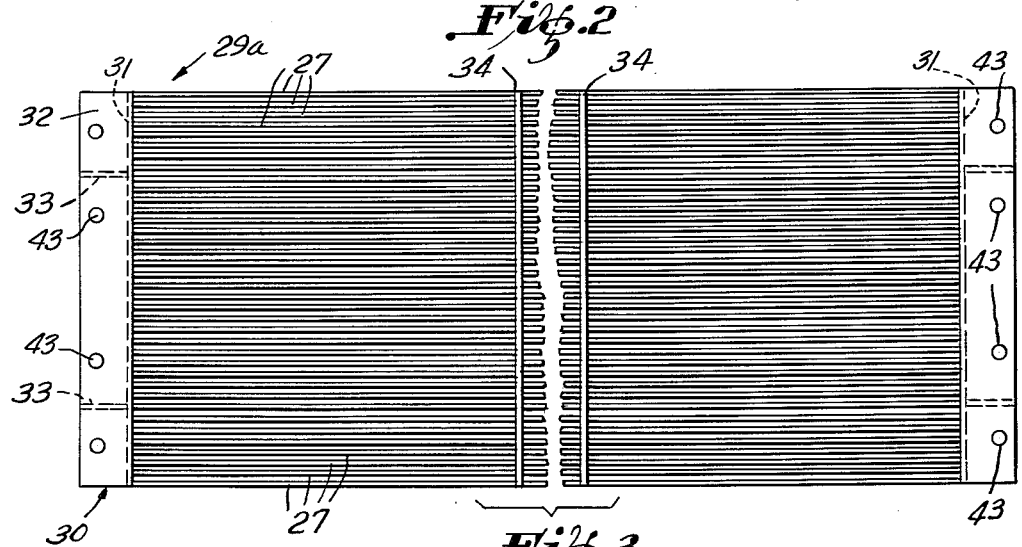
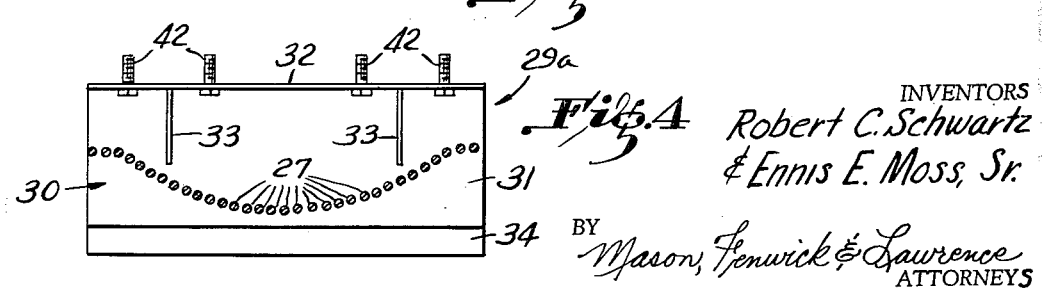
INVENTORS
Robert C. Schwartz
& Ennis E. Moss, Sr.
BY Mason, Fenwick & Lawrence
ATTORNEYS

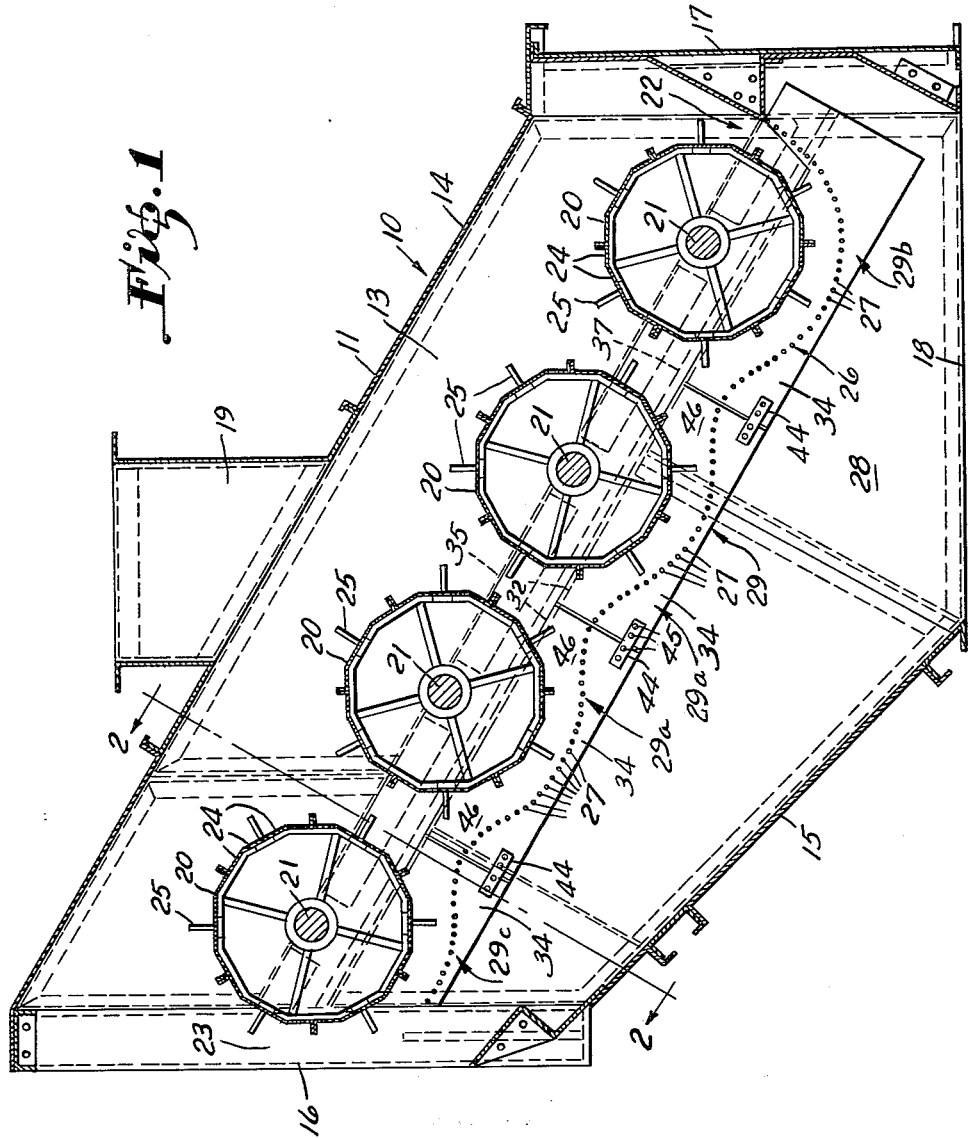

United States Patent Office 3,049,763
Patented Aug. 21, 1962

3,049,763
GRID STRUCTURE FOR SEED COTTON CLEANERS AND THE LIKE
Robert C. Schwartz and Ennis E. Moss, Sr., Lubbock, Tex., assignors to Botany Industries, Inc., Passaic, N.J., a corporation of New Jersey
Filed May 16, 1961, Ser. No. 118,754
6 Claims. (Cl. 19—93)

The present invention relates in general to cleaning apparatus for removing contaminating substances from material such as cotton and the like by passing the contaminated material over grids, and more particularly to cotton cleaning apparatus having grids and cleaning cylinders for removing sticks, leaves, and other contaminating substances which particularly characterizes mechanically harvested cotton.

In the ensuing description, the invention will be described in relation to cotton cleaning apparatus for cleaning seed cotton prior to its introduction into ginning apparatus, although it will be understood that the apparatus of the present invention is applicable to many other types of material cleaning or handling apparatus requiring the use of grids.

Cotton cleaning apparatus for removing trash such as dirt, sticks, limbs, leaves and the like from seed cotton conventionally employs a plurality of rotating cleaning cylinders or drums spaced along a cotton flow path having means on the periphery thereof, such as radially projecting spikes or saw teeth, for transferring the seed cotton along the flow path, and series of suitably spaced grid rods over which the cotton is moved for separating the trash from the seed cotton and permitting the trash to pass gravitationally between the spaced grid rods for collection and transportation to a point outside the cleaning apparatus casing. Such apparatus usually comprises a plurality of cleaning stages spaced along the cotton flow path within the cleaner casing, each stage comprising a cleaning cylinder and a grid section having a plurality of parallel spaced grid rods arranged in a concentric arc about the underside of the associated cylinder and extending transversely between the side sheets of the cleaner casing, the grid rods being fixed at their opposite ends to planiform side plates. The planiform side plates of each grid section are conventionally affixed to the cleaner casing by bolting the same to the side sheets or walls of the casing with the grid side plates tightly abutting the inner surfaces of the casing side sheets. With this construction, however, it has been found that trash, sticks and other foreign substances entrained with the seed cotton frequency accumulate between the outer surfaces of the grid section end plates and the side sheets of the casing, becoming wedged between these surfaces and causing the fastening means in the grid section mountings to bind and resist demounting and removal of the grid sections from the casing. Since the grid sections must be periodically removed for repair, replacement or other purposes, this wedging of foreign matter between the grid section end plates and the cleaner side sheets severely complicates the job of demounting and removing the grid sections. In some instances, it has become necessary to spring the side sheets of the cleaner casing apart to effect removal of the grid section.

Further, the adjacent ends of successive grid sections in conventional cleaners are spaced apart below the transfer areas between successive cleaning cylinders to provide space for transverse support members and the spaces between successive grid sections aligned below the transfer areas are closed off by partitions or sheeting, thereby eliminating these regions as a cleaning surface.

An object of the present invention is the provision of novel cleaning apparatus of the type employing grids for removing debris from materials advanced along a selected flow path which will eliminate the aforementioned difficulties and disadvantages.

Another object of the present invention is the provision of novel cleaning apparatus for materials such as seed cotton and the like, having a plurality of cleaning drums for advancing the material to be cleaned along a selected flow path and a plurality of grid sections each formed of spaced grid rods, wherein the grid sections are supported adjacent side walls of a casing in such a way that debris will not interfere with demounting and removal of the grid sections from the casing.

Another object of the present invention is the provision of novel cleaning apparatus for removing debris from seed cotton and the like having a plurality of cleaning stages including cleaning cylinders spaced along a flow path in a cleaner casing from an entering point of the seed cotton and the discharge point, wherein a contiguous grid formed of transverse spaced grid rods extends from the entering point to the discharge point.

Other objects, advantages and capabilities of the present invention will become apparent from the following detail description, taken in conjunction with the accompanying drawings illustrating a preferred embodiment of the invention.

In the drawings:
FIGURE 1 is a vertical longitudinal section view of seed cotton cleaning apparatus constructed in accordance with the present invention;
FIGURE 2 is a fragmentary transverse section view taken along the line 2—2 of FIGURE 1;
FIGURE 3 is a fragmentary top plan view of one of the grid sections constructed in accordance with the present invention; and
FIGURE 4 is a side elevation of one of the grid sections.

Referring to the drawings wherein like reference characters designate corresponding parts throughout the several figures, an exemplary embodiment of the present invention is illustrated as incorporated in an inclined seed cotton cleaner 10 for removing sticks, dirt, sand, leaves and similar debris of the type usually encountered in mechanically harvested seed cotton from the seed cotton prior to introduction of the cotton into the gin stand. The seed cotton cleaner 10 is of typical configuration and includes a casing 11 usually formed of sheet metal, having sides 12 and 13, an inclined top sheet 14, and an inclined bottom sheet portion 15. The top sheet 14 and bottom sheet portion 15 extend downwardly from an outlet end 16 along diverging planes with the bottom sheet portion 15 terminating in spaced relation to a vertical feed end wall 17 providing an opening 18 through which the debris is discharged, for example, into a conventional dirt hopper to be attached to the casing 10 below the opening 18. The top sheet 11 is provided with an inlet stack or fitting 19 through which the cotton may be introduced to fall toward the feed end wall 17 of the casing. Disposed within the casing are a plurality of spiked cleaning cylinders or drums 20 supported for rotation on transverse shafts 21 arranged parallel to each other along a plane inclining upwardly and to the left as viewed in FIGURE 1 from a feed point 22 adjacent the end 17 to a discharge point 23 adjacent the end 16. The end 16 is provided with an opening through which the cleaned cotton is drawn to subsequent processing apparatus. The spiked cleaning cylinders 20 in the embodiment herein illustrated are of dodecagonal cross-sectional configuration providing a plurality of flat plate sections 24 along the surface thereof and radially outwardly projecting spikes 25, the cylinders 20 being driven by a suitable prime mover to advance the cotton upwardly from the feed point 22 to the discharge point 23 along a grid generally indicated at 26 formed of transverse parallel rods 27 arranged in concentric arcs about the undersides of the cleaning cylinders 20 and spaced from each other along the flow path of the cotton to permit passage of the sticks, leaves, dirt and other debris therethrough into the trash receiving zone 28 while retaining the cotton above the grid rods 27.

The grid 26 is formed of a group of modular units or sections arranged longitudinally of the casing or along the cotton flow path, the sections being generally indicated by the reference character 29 and at least those grid sections lying intermediate the endmost grid sections, indicated at 29a, being of a uniform standard construction which is more clearly illustrated in FIGURES 2, 3 and 4. These standard grid sections 29a are of a width to transversely span the casing 11, and are provided with an end plate 30 of right-angular configuration at each end having a vertically disposed panel portion 31 in which the ends of the grid rods 27 are affixed and an outwardly projecting top flange 32 integral with the panel portion 31, together with gusset plates 33 to strengthen the end plates against deflection from the center of the grid section in a downward direction. A plurality of intermediate bracing plates 34 are disposed intermediate the end plates 30 in vertical planes paralleling the direction of cotton flow through the casing and the panel portions 31. These bracing plates 34 have apertures through which the grid rods 27 extend and are provided to further strengthen the associated grid section and position the grid rods 27 so that a selected spacing between the rods is maintained generally throughout the width of the grid section. For example, in grid sections of approximately 72 inches width, three of such intermediate bracing plates 34 may be provided to maintain the grid rods 27 spaced at 5/16 inch or 11/16 inch on centers.

The feed and discharge end grid sections, identified as 29b and 29c, are similarly constructed, but may have a slightly different general configuration to arrange the grid rods 27 in appropriately curved paths and adapt these two sections to the conditions obtaining at the feed and discharge ends of the flow path.

The sides of the casing 11 are modified from the usual arrangement to support the plating cylinder shafts 21 and the grid sections 29 in a novel manner to alleviate wedging of trash removed from the cotton between the grid section end plates and the sides, and thus facilitate removal of the grid sections 29 from the casing. To this end, an angle beam 35 extends along the length of each side of the casing 11 at a location immediately below the axis of the cylinder shaft 21 having a vertical upwardly projecting flange 36 and a lateral outwardly projecting flange 37. The opposite ends of the angle beam 35 may be suitably secured to the supporting framework for the opposite ends of the casing 11. The sides 12 and 13 are formed of upper and lower panel sections 38 and 39 respectively, the upper panel section 38 extending from the vertical flange 36 of the angle beam 35 to the top sheet 14 along a vertical plane substantially aligned with the vertical flange 36. The lower panel section 39 extends from the lateral flange 37 of the angle beam 35 to the lower end of the casing 11 and lies in a vertical plane spaced outwardly from the plane of the associated upper panel section 38 providing an outwardly offset zone 40 below the lateral flange 37 of the angle beam 35 bounded along its upper end by a portion of the lateral flange 37. The lateral flange 37 of the angle beam 35 forms the supporting member for the bearing mounts 41 in which the cylinder shafts 21 are journaled and also forms the supporting member for the end plates 30 of the grid sections 29.

The grid sections 29 are secured in position within the casing by raising the same upwardly from the lower end of the casing until the top flanges 32 of the end plates 30 butt against the lower surfaces of the portions of the angle beam lateral flanges 37 lying inwardly of the lower panel sections 39 of the side sheets, and affixing the grid sections 29 in this position by cap screws and nuts or similar fastening devices 42 extending through apertures 43 in the top flanges 32 and registering apertures in the lateral flanges 37 of the angle beams 35. Suitably apertured metal straps 44 are then centered relative to the lines of juncture between the bracing plates 34 of adjacent grid sections 29 and are affixed by bolts 45 or other conventional fastening means to the adjacent lapped portions of the bracing plates 34. This strengthens the grid 26 all up and down the cleaner, in the middle as well as on each side of the center.

It will be apparent that the outward offsetting of the lower panel sections 39 providing the relieved areas or offset zones 40 through which the top flanges 32 of the end plates 30 can be lowered and the mounting of the end plates 30 by securing the top flanges 32 below and against the lateral flanges 37 of the angle beams 35, provides a construction wherein the vertical panel portions of the end plates are spaced substantially from the panel sections 39, thereby preventing any accumulation of trash in the space therebetween which would complicate demounting of the grid sections 29 from the casing 11.

Further, the above-described construction provides a contiguous grid extending from the entering or feed point 22 of the cotton to the discharge point 23 along the entire length of the cleaner, so that cleaning grid surfaces are provided underneath the transfer areas 46 between successive cleaning cylinders 20 as well as beneath the cylinders themselves. By providing such a continuous cleaning surface, increased cleaning is obtainable compared to the cleaning achieved in conventional structures wherein support members and covering panels having no cleaning properties are provided beneath the transfer areas.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Cleaning apparatus for removing contaminating substances from fibrous material and the like comprising a plurality of rotatable cleaning cylinders serially arranged along a flow path for rotation about substantially horizontal parallel axes arranged transversely of the flow path, a grid structure extending in selectively spaced relation to the cleaning cylinders below the same over which the fibrous material is moved by said cylinders, a casing enclosing said cylinders and grid structure having an upper region of a width to accommodate the cylinders and a relatively wider lower region below said cylinders, said casing including downwardly facing transition side wall portions at each side of the casing at the top of the wider lower region, said grid structure including at least one grid section comprising a plurality of grid rods, a pair of side plates at the opposite sides of said grid section having a vertical plate portion supporting ends of the grid rods disposing the grid rods in parallelism therebetween along generally arcuate paths concentric with the axis of one of said cylinders spaced suitably to pass the contaminating substances therethrough while restraining passage of fibrous material, said side plates each having an outwardly projecting mounting flange integral with said plate portion extending into underlapping relation with said transition side wall portions, and means releasably fastening said mounting flanges of each grid section to said transition side wall portions to support said grid section in depending relation therefrom.

2. Cleaning apparatus for removing contaminating substances from fibrous material and the like comprising a plurality of rotatable cleaning cylinders serially arranged along a flow path for rotation about substantially horizontal parallel axes arranged transversely of the flow path, a grid structure extending in selectively spaced relation to the cleaning cylinders below the same over which the fibrous material is moved by said cylinders, a casing enclosing said cylinders and grid structure having sides adjacent the opposite ends of the cylinders, said casing sides having outwardly offset portions extending from a level adjacent and below the cylinder axes to the bottom of the casing, said grid structure including at least one grid section comprising a plurality of grid rods, a pair of side plates at the opposite sides of said grid section having a vertical plate portion supporting ends of the grid rods disposing the grid rods in parallelism therebetween along generally arcuate paths concentric with the axis of one of said cylinders spaced suitably to pass the contaminating substances therethrough while restraining passage of fibrous material, said side plates each having an outwardly projecting mounting flange integral with said plate portion extending into the outwardly offset portion of said sides, each of said sides including a supporting beam portion having a downwardly facing surface at the top of the offset portion against which said mounting flange is seated in underlying relation thereto, and generally vertically extending fastening means releasably interconnecting the lapping portions of said supporting beams and mounting flanges for supporting the grid section in depending relation from the former.

3. Cleaing apparatus for removing contaminating substances from fibrous material and the like comprising a plurality of rotatable cleaning cylinders serially arranged along a flow path for rotation about substantially horizontal parallel axes arranged transversely of the flow path, a grid structure extending in selectively spaced relation to the cleaning cylinders below the same over which the fibrous material is moved by said cylinders, a casing enclosing said cylinders and grid structure having sides adjacent the opposite ends of the cylinders, said casing sides having means intermediate the height thereof supporting said cylinders along a selected rectilinear axis and having outwardly offset portions extending from a level adjacent and below the cylinder axes to the bottom of the casing, said grid structure including at least one grid section comprising a plurality of grid rods, a pair of side plates at the opposite sides of said grid section having a vertical plate portion supporting ends of the grid rods disposing the grid rods in parallelism therebetween along generally arcuate paths concentric with the axis of one of said cylinders spaced suitably to pass the contaminating substances therethrough while restraining passage of fibrous material, said side plates each having an outwardly projecting mounting flange integral with said plate portion extending into the outwardly offset portion of said sides, the means supporting said cylinders including a supporting beam portion at each of said sides having a downwardly facing surface at the top of the offset portion against which said mounting flange is seated in underlying relation thereto, and generally vertically extending fastening means releasably interconnecting the lapping portions of said supporting beams and mounting flanges for supporting the grid section in depending relation from the former, said outwardly offset side portions defining a zone of enlarged width transversely of the casing for accommodating inserting and withdrawal movement of the grid section below said supporting beams.

4. In cleaning apparatus for removing contaminating substances from fibrous material and the like having a casing including supporting frame members along the sides thereof having downwardly facing flat surfaces and a plurality of rotatable cleaning cylinders serially arranged along a flow path for rotation about spaced parallel axes arranged transversely of the flow path and a grid structure in selectively spaced relation below the cleaning cylinders over which the fibrous material is moved by said cylinders, said grid structure comprising a plurality of modular grid sections spaced serially along the flow path, one grid section being associated respectively with each of said cleaning cylinders, each of said grid sections comprising a plurality of grid rods extending in parallelism with each other transversely of the flow path to be arranged in a generally arcuate path concentric with the axis of the associated cleaning cylinder, a pair of side plates for each of said grid sections supporting the opposite ends of said grid rods each having an outwardly projecting top flange, the top flanges of the pair of side plates extending oppositely from each other beyond the ends of the grids rods and having bolt openings therethrough, said top flanges being adapted to be supported in underlying relation against the downwardly facing flat surfaces of the supporting frame members of the casing by fastening bolts extending through the frame members and the openings of said top flanges.

5. Cleaning apparatus for removing contaminating substances from seed cotton and the like comprising an elongated casing having opposite sides, a bottom wall, and a top wall, a plurality of rotatable cleaning cylinders extending transversely of the casing and rotatable about parallel axes spaced along a flow path within the casing, a grid structure spaced below said cleaning cylinders over which the cotton is moved by said cylinders between feed and discharge points of said flow path, said grid structure comprising a plurality of modular grid sections spaced serially along the flow path, one grid section being associated respectively with each cleaning cylinder, each of said grid sections comprising a pair of end plates, one disposed adjacent each of the sides of said casing adjacent and depending below the opposite ends of the associated cleaning cylinder, a plurality of grid rods transversely spanning the casing between the pair of side plates of the asociated grid section and disposed in parallel spaced relation along an arcuate path generally concentric with the axis of the associated cleaning cylinder providing spaces between said rods sized to pass the contaminating substances therethrough while restraining the seed cotton above the grid rods, said side plates each having a vertically disposed panel portion extending parallel to the casing sides and supporting the ends of said grid rods and an outwardly projecting top mounting flange extending from the upper edge of the panel portion, said sides of the casing each including an elongated angle beam located adjacent and below the cylinder axes extending substantially the length of the casing having a laterally projecting flange and upper and lower side wall sections extending from said angle beam to the top and bottom walls of the casing respectively, the lower side wall sections lying in vertical planes spaced outwardly from said upper side sections providing a transversely enlarged zone below said angle beam permitting inserting and withdrawal movement of said outwardly projecting top flanges of said side plates vertically therethrough, the laterally projecting flanges of said angle beams providing downwardly facing flat bearing surfaces at the tops of said enlarged zone adjacent the casing sides, and fastening means removably fixing the top flanges of said side plates to the laterally projecting flanges of said angle beams with said top flanges in underlying abutting relation thereto.

6. Cleaning apparatus for removing contaminating substances from seed cotton and the like comprising an elongated casing having opposite sides, a bottom wall, and a top wall, a plurality of rotatable cleaning cylinders extending transversely of the casing and rotatable about parallel axes spaced along a flow path within the casing providing transition zones therebetween, a grid structure spaced below said cleaning cylinders over which the cotton is moved by said cylinders between feed and discharge points of said flow path, said grid structure comprising a plurality of modulator grid sections spaced serially along the flow path, one grid section being associated respectively with each cleaning cylinder, each of said grid sections comprising a pair of end plates, one disposed adjacent each of the sides of said casing adjacent and depending below the opposite ends of the associated cleaning cylinder, a plurality of grid rods transversely spanning the casing between the pair of side plates of the associated grid section and fixed at their ends to said end plates, said grid rods being disposed in parallel spaced relation along an arcuate path generally concentric with the axis of the associated cleaning cylinder providing spaces between said rods sized to pass the contaminating substances therethrough while restraining the seed cotton above the grid rods, means for releasably supporting the side plates of each grid section, and said grid section being disposed in aligned relation along the flow path with their grid rods in parallelism and the endmost grid rods of adjacent grid sections spaced closely adjacent each other in substantial correspondence with the sized spacing between the grid rods of each grid section to provide a substantially continuous grid structure along the whole length of the flow path between said feed and discharge points.

References Cited in the file of this patent

UNITED STATES PATENTS 2,205,017     McLean _____ June 18, 1940